United States Patent Office 2,774,741
Patented Dec. 18, 1956

2,774,741

PROCESS FOR BREAKING EMULSIONS

Anthony J. Martinelli, Easton, Pa., assignor to General Aniline & Film Corporation, New York, N. Y., a corporation of Delaware No Drawing. Application December 3, 1954,
Serial No. 473,041

3 Claims. (Cl. 252—331)

This invention relates to the provision of a new process for resolving emulsions of the water-in-oil type.

Various liquid systems exist in industry which are in the form of water-in-oil type emulsions which must be separated into their component parts of oil and water. Prime example of such liquid systems are the petroleum emulsions commonly referred to as "cut oil," "roily oil," "emulsified oil," etc., which are obtained from producing wells, pipe lines, from the bottoms of oil storage tanks and the like, and comprise fine droplets of naturally occurring waters or brines dispersed in a more or less permanent state throughout the oil which constitutes the continuous phase of the emulsion. Water-in-oil type emulsions are also formed under controlled conditions in processes for removing impurities, particularly inorganic salts, from pipe line oil. Other water-in-oil type emulsions encountered in nature or industry include gas tar emulsions, tar sand oil emulsions, emulsions encountered in the manufacture of antibiotic agents, and in the sweetening or caustic washing of hydrocarbons, and the like.

It is an object of this invention to provide a novel process for resolving, breaking or separating water-in-oil emulsions into their oily and aqueous component parts. Other objects and advantages will appear as the description proceeds.

The above objects are attained by the instant invention which comprises subjecting water-in-oil type emulsions to the action of a member selected from the group consisting of polymeric vinyl ethers characterized by the formulae:

I
$$\left[ \begin{array}{c} \text{H} \quad \text{H} \\ -\text{C}-\text{C}- \\ | \quad | \\ \text{H} \quad \text{O}-(\text{R}^1\text{O})_x-\text{R} \end{array} \right]_n$$

and

II
$$\left[ \begin{array}{c} \text{H} \quad \text{H} \\ -\text{C}-\text{C}- \\ | \quad | \\ \text{H} \quad \text{O}-\text{CH}_2-(\text{CH}_2-\text{CH})_y-\text{R}^3 \\ \quad\quad\quad\quad\quad | \\ \quad\quad\quad\quad\quad \text{O}\text{R}^2 \end{array} \right]_m$$

wherein $R^1$ is a divalent lower alkylene radical; R, $R^2$ and $R^3$ are lower alkyl radicals; $x$ and $y$ have values of from 1 to 7; and $n$ and $m$ have values of at least 5. These polymers may be readily prepared by polymerization of a vinyl ether of the requisite alcohol, or by reacting polyvinyl alcohol with the requisite number of moles of the alcohol. It will be understood that in the above formulae, R, $R^1$, $R^2$ and $R^3$ may contain the same or different number of carbon atoms and may be branched or straight chain.

Polymers of the type I formula given above may be broadly described as polymeric vinyl ethers of alkoxyalkanols, alkoxyalkenoxy alkanols and alkoxypolyalkenoxy alkanols having the formula $HO-(R^1O)_x-R$ wherein $R^1$, R and $x$ have the values given above. As representative of such alcohols, there may be mentioned the mono-methyl, -ethyl, -propyl, and -butyl ethers of mono-, di-, tri-, tetra-, and penta-ethylene glycols, -propylene glycols, and -butylene glycols, 2-ethylbutyl ether of ethylene glycol, and the like, or mixtures thereof. The monomeric and polymeric vinyl ethers of these alcohols are well known in the art and methods for their preparation are disclosed in U. S. P. No. 2,104,000.

Polymers having the type II formula given above may be broadly described as polymeric vinyl ethers of alkoxy-1-alkanols and polyalkoxy-1-alkanols having the formula

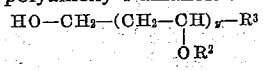

wherein $R^2$, $R^3$ and $y$ have the values given above. As representative of such alkoxy alkanols there may be mentioned 3-methoxy-1-butanol, 2-methoxy-1-hexanol, 3-ethoxy-1-butanol, 3-butoxy-1-butanol, 3,5-dimethoxy-1-hexanol, 3,5-dimethoxy-1-octanol, 3,5-diethoxy-1-hexanol, 3,5,7-trimethoxy-1-octanol, 3,5,7 - trimethoxydodecanol, 3,5,7 - tripropoxy-1-octanol, 3,5,7,9-tetramethoxy-1-decanol, 3,5,7,9-tetramethoxydodecanol, 3,5,7,9-tetraethoxy-1-decanol, 3,5,7,9,11-pentamethoxy-1-dodecanol, 3,5,7,9, 11-pentaethoxy-1-dodecanol, 3 - methoxy - 5 - ethoxy - 1-hexanol, 3,5 - dimethoxy - 7 - propoxy - 1 - octanol, 3,5-di ethoxy-7,9,11-trimethoxy-1-dodecanol, and the like, or mixtures thereof. These alkoxy-1-alkanols and polyalkoxy-1-alkanols may be prepared by reacting, in known manner, the proper alkyl vinyl ether with an alkanol to yield the dialkyl acetal or other appropriate acetal, reacting the latter with the same or different additional alkyl vinyl ethers, followed by hydrolysis-reduction of the reaction product. The ratio of alkanol to alkyl vinyl ether may vary from about 2.0:1.0 to 20:1. The crude acetal which is a mixture, may then be distilled to yield individual components which may be subjected to simultaneous hydrolysis-reduction to yield individual alkoxy alkanols as described in Examples 1, 4 and 5 of U. S. P. No. 2,618,663. Alternatively, the crude acetal may, if desired, be subjected to simultaneous hydrolysis-reduction as described in Example 3 of said patent and the mixture of alkanols employed as such for the production of the polymeric vinyl ethers useful in the instant invention. Mixtures of alkoxy-1-alkanols and polyalkoxy-1-alkanols may be blended in any desired proportions and the mixtures employed for etherifying polyvinyl alcohol or for vinylation and subsequent polymerization to produce the polymeric vinyl ethers useful herein.

Polymers operative in the instant invention have molecular weights ranging from at least 600 up to 2,000,000 or more. Viscosity measurements are commonly used as an indication of the average molecular weight of polymeric compositions. The K value (Fikentscher) of any particular mixture of polymers is calculated from viscosity data and is useful as an indication of the average molecular weight of such mixture. Its determination is fully described in "Modern Plastics," 23, No. 3, 157–61, 212, 214, 216, 218 (1945) and is defined as 1000 times $k$ in the empirical relative viscosity equation:

$$\frac{\log_{10} \eta_{\text{rel}}}{C} = \frac{75k^2}{1+1.5kC} + k$$

wherein C is the concentration in grams per hundred cc. of polymer solution and $\eta_{\text{rel}}$ is the ratio of the viscosity of the solution to that of pure solvent. The K values are reported as 1000 times the calculated viscosity coefficient in order to avoid the use of decimals. For the purpose of the present invention, there may be employed those polymeric vinyl ethers having a K value of about 10 to 200 and preferably from about 15 to 100.

K values and specific viscosities ($\eta_{\text{sp}}$) are interconvertible and are related through relative viscosity ($\eta_{\text{rel}}$).

Thus, when viscosity measurements are taken on solutions which have a concentration of 1.00 gram of polymer per deciliter of solution at 25° C. ($C=1$), the relationships are as follows:

$$\eta_{rel} = \eta_{sp} + 1$$

Relative viscosity=specific viscosity plus one. Relative viscosity = $10^{[0.001K+0.000075K^2/(1+0.0015K)]}$.

Hence, $\eta_{sp} = -1 + 10^{[0.001K+0.000075K^2/(1+0.0015K)]}$. Relative viscosity, specific viscosity and K are dimensionless, whereas inherent viscosity $$\frac{(\log_e \eta_{rel})}{C}$$

and intrinsic viscosity (the limit of inherent viscosity as C approaches zero) have the dimensions of dilution, i. e., the reciprocal of concentration. Intrinsic viscosity and K are intended to be independent of concentration.

The instant invention may be put into practice for demulsification by simply introducing a relatively small proportion of an agent of the type described above into a relatively large proportion of water-in-oil emulsion, admixing the agent and emulsion with agitation in any of the various types of apparatus now generally used to resolve or break petroleum emulsions with a chemical reagent, preferably with application of heat, and allowing the mixture to stand quiescent until the undesirable water content of the emulsion separates and settles from the mass. Slight agitation in the water layer at this point is helpful in breaking a "webbing" that sometimes forms. The agent may be added directly or it may be first dissolved in or diluted with any suitable liquid medium to produce a concentrate or the like. As suitable solvents and diluents there may be mentioned water, petroleum hydrocarbons, benzene, toluene, xylene, aliphatic alcohols such as methyl alcohol, ethyl alcohol, denatured alcohol, propyl alcohol, isopropyl alcohol, butyl alcohol, octyl alcohol, mixtures thereof, and the like. Said agent may be employed as the sole demulsifier or it may be employed in admixture with other suitable well known types of demulsifying agents. The solubility of the agent in the oil or water of the emulsion to be treated is not particularly important in view of the very small amounts employed. Thus, concentrations of agent of the order of from about 10 to 100 parts per million (p. p. m.) by volume in the emulsion are usually sufficient although concentrations outside of this range may in some cases be effective and economically feasible.

The following table shows the results obtained in testing a 3-methoxybutyl vinyl ether polymer having a specific viscosity of 0.25, corresponding to a Fikentscher K value of 30.5, at various strengths for demulsification of a crude oil emulsion obtained from the oil fields at Hastings, Texas. For these tests the amount of demulsifier disclosed in the first column of the table was added to 100 ml. of crude oil emulsion.

The admixture, in capped 4-ounce round bottles, was mechanically shaken for 30 minutes. After removal, the bottles were allowed to stand quiescent for 15 minutes. Color of sample and any water separation were noted. The bottles were then immersed in a water bath at 140° F. (60° C.) for 10 minutes, water separation being noted. These were then returned to the mechanical shaker for another 10 minutes, removed and allowed to stand quiescent for 15 minutes. Color and water drop were noted. The bottles were then slightly agitated by swirling the contents to break a webbing that forms in the water layer. In the table, heights of the water and oil are given in centimeters, and the concentration of demulsifier is given in parts per million (p. p. m.).

*Table*

| Amount of Demulsifier Used | Shaking 30 Minutes (Color) | Standing 15 Minutes | Heated 140° F. for 10 Minutes | Shaking 10 Minutes, Standing 15 Minutes | Swirled [1] |
|---|---|---|---|---|---|
| Concentration=15 p. p. m.; 0.15 ml. of a 1% by wgt. (Xylene—50) (Isopropyl Alcohol—50) Solution. | Dark Greenish Brown. | No appreciable separation. | Oil 4.1, Dark Green; Water 2.9, Very Webby. | 4.0, Dark Green; 3.0, Very Webby. | Clear. |
| Concentration=15 p. p. m.; 0.15 ml. of a 1% by wgt. Isopropyl Alcohol Solution. | Cocoa | do | Oil 4.1, Greenish Brown; Water 2.9, Very Webby. | 4.1, Dark Green; 2.9, Very Webby. | Do. |
| Concentration=50 p. p. m.; 0.5 ml. of a 1% by wgt. (Xylene—50) (Isopropyl Alcohol—50) Solution. | Dark Green [2] | do | Oil 4.2, Dark Green; Water 2.8, Very Webby. | do | Do. |
| Concentration=100 p. p. m.; 1.0 ml. of a 1% by wgt. (Xylene—50) (Isopropyl Alcohol—50) Solution. | ([2]) | do | Oil 4.1, Dark Green; Water 2.9, Slightly Webby. | 4.0, Dark Green; 3.0 Webby. | Do. |
| Concentration=100 p. p. m.; 1.0 ml. of a 1% by wgt. Isopropyl Alcohol Solution. | ([3]) | do | do | do | Do. |

[1] Water layers become clear of webbing after swirling.
[2] Becomes dark green in about 5–10 minutes.
[3] Becomes dark green in about 2 minutes.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

I claim:

1. A process for breaking a water-in-oil type emulsion comprising subjecting such emulsion to the action of a polymeric vinyl ether characterized by the formula

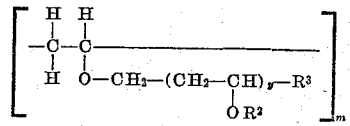

wherein $R^2$ and $R^3$ are lower alkyl radicals; $y$ has a value of from 1 to 7; and $m$ has a value of at least 5.

2. A process as defined in claim 1 wherein said polymeric vinyl ether is polymeric 3-methoxybutyl vinyl ether.

3. A process as defined in claim 2 wherein said polymer has a K value of about 30.

References Cited in the file of this patent

UNITED STATES PATENTS

| | | |
|---|---|---|
| 2,104,000 | Reppe et al. | Dec. 28, 1947 |
| 2,618,663 | Glickman | Nov. 18, 1952 |